United States Patent
Lindener et al.

(10) Patent No.: US 12,431,772 B2
(45) Date of Patent: Sep. 30, 2025

(54) SHAFT EARTHING RING WITH A METAL SUPPORT HAVING A VENTILATION OPENING

(71) Applicant: BRUSS SEALING SYSTEMS GMBH, Hoisdorf (DE)

(72) Inventors: Bjoern Lindener, Luebeck (DE); Juergen Grundt, Neumuenster (DE); Manfred Brand, Tremsbuettel (DE); Samuel Neumann, Ahrensburg (DE); Matthias Spitz-Valentiner, Hamburg (DE); Tobias Saberniak, Luebeck (DE)

(73) Assignee: BRUSS SEALING SYSTEMS GMBH, Hoisdorf (DE)

( * ) Notice: Subject to any disclaimer, the term of this patent is extended or adjusted under 35 U.S.C. 154(b) by 805 days.

(21) Appl. No.: 17/703,323

(22) Filed: Mar. 24, 2022

(65) Prior Publication Data
US 2022/0311315 A1    Sep. 29, 2022

(30) Foreign Application Priority Data

Mar. 24, 2021  (DE) .......................... 102021202863.2
Feb. 24, 2022  (DE) .......................... 102022104417.3

(51) Int. Cl.
*H02K 11/40*   (2016.01)
*H01R 39/12*   (2006.01)
*H02K 7/00*    (2006.01)

(52) U.S. Cl.
CPC ............ *H02K 11/40* (2016.01); *H01R 39/12* (2013.01); *H02K 7/003* (2013.01)

(58) Field of Classification Search
CPC ........ H02K 11/40; H02K 7/003; H01R 39/12; H01R 39/08; H01R 4/64
See application file for complete search history.

(56) References Cited

U.S. PATENT DOCUMENTS

| | | | |
|---|---|---|---|
| 2010/0001602 A1* | 1/2010 | Bossaller | H02K 11/40 29/596 |
| 2012/0299251 A1* | 11/2012 | Ogishi | C09K 3/1009 277/549 |
| 2014/0203514 A1 | 7/2014 | Colineau et al. | |
| 2016/0010750 A1 | 1/2016 | Colineau et al. | |

FOREIGN PATENT DOCUMENTS

| | | |
|---|---|---|
| DE | 10 2013 000 982 B4 | 10/2015 |
| DE | 10 2014 010 269 B4 | 6/2020 |
| DE | 10 2019 133 886 A1 | 6/2021 |
| JP | S60-167263 U | 4/1985 |
| JP | 2015-207533 A | 11/2015 |

OTHER PUBLICATIONS

Search Report issued by the German Patent and Trademark Office dated Dec. 20, 2021 with respect to German Priority application No. 10 2021 202 863.2.

* cited by examiner

*Primary Examiner* — Emily P Pham
(74) *Attorney, Agent, or Firm* — SALIWANCHIK, LLOYD & EISENSCHENK

(57) ABSTRACT

A shaft earthing ring for establishing an electrical potential connection between a rotating shaft and a housing of an electric motor comprises an electrically conductive earthing element which has a contact portion that contacts the shaft, and a metal support body fixed to the housing. The metal support body has at least one ventilation opening which allows ventilation of a housing interior while bypassing the earthing element.

22 Claims, 17 Drawing Sheets

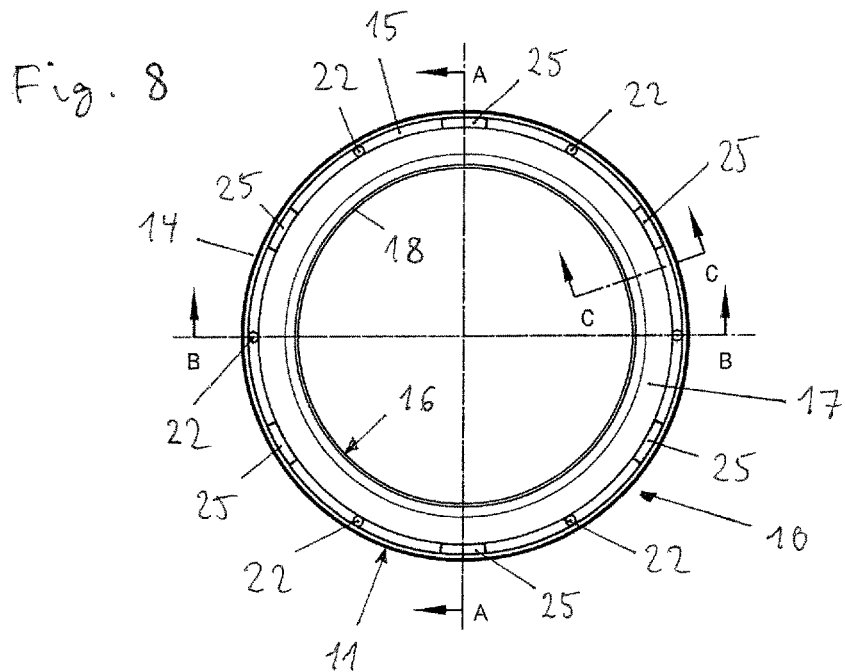
Fig. 8
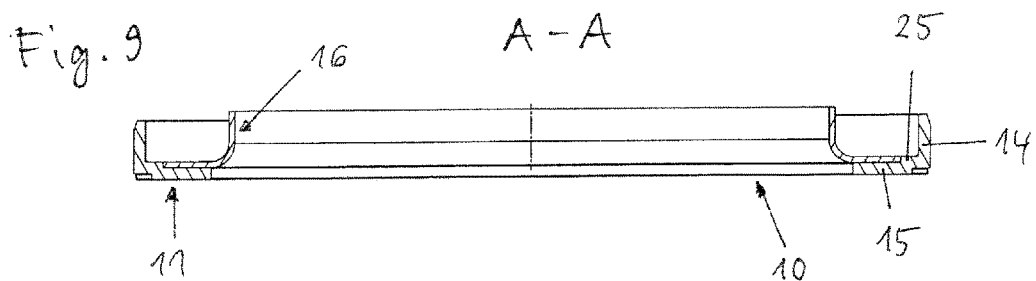
Fig. 9  A-A
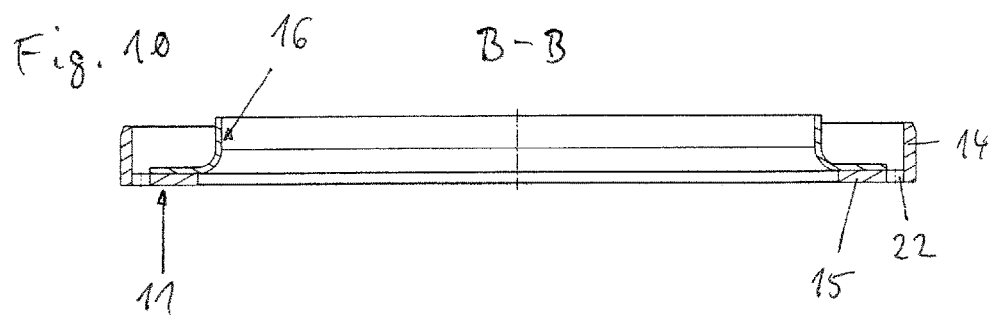
Fig. 10  B-B
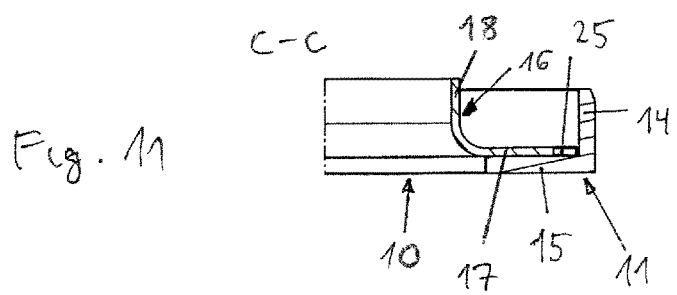
Fig. 11  C-C

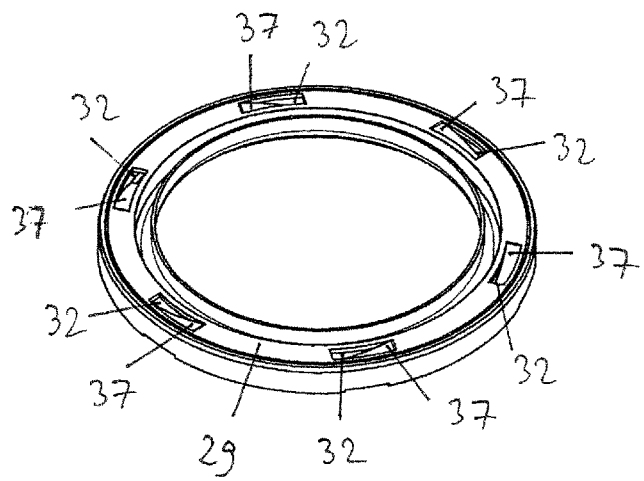
Fig. 21
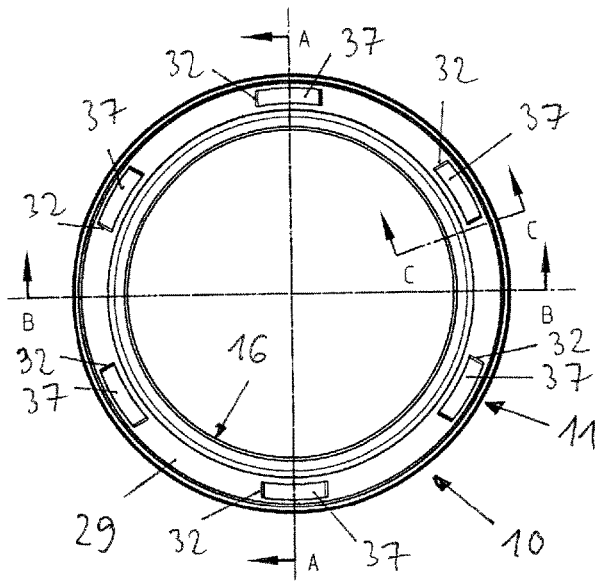
Fig. 22
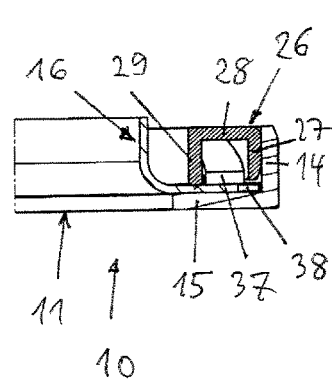
Fig. 24
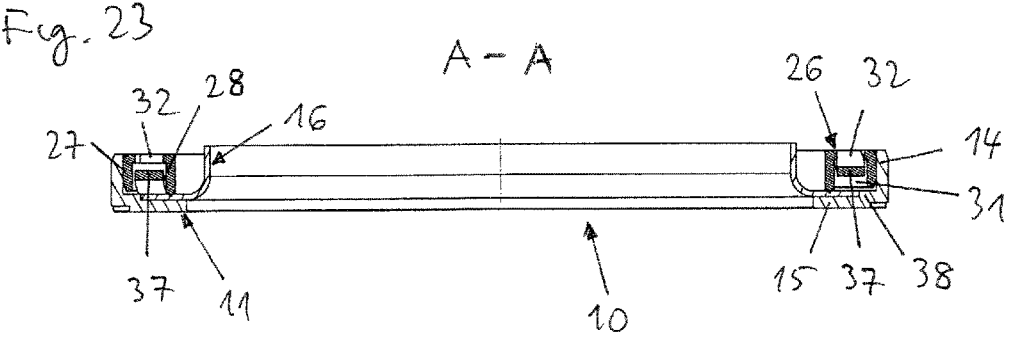
Fig. 23  A-A

A-A

SHAFT EARTHING RING WITH A METAL SUPPORT HAVING A VENTILATION OPENING

CROSS-REFERENCE TO A RELATED APPLICATION

This application claims priority under 35 U.S.C. § 119(e) of German Patent Application No. DE 10 2021 202 863.2, filed on Mar. 24, 2021; and German Patent Application No. DE 10 2022 104 417.3, filed Feb. 24, 2022, which are incorporated herein by reference in their entirety.

FIELD OF THE INVENTION

The present invention relates to a shaft earthing ring for establishing an electrical potential connection between a rotating shaft and a housing of an electric motor, comprising an electrically conductive earthing element which has a contact portion that contacts the shaft, and a metal support body fixed to the housing.

BACKGROUND OF THE INVENTION

The lack of electrical charge dissipation on electric motors or electric drives can significantly reduce the service life of ball bearings due to unwanted spark discharges between the balls and the ball bearing housing. Likewise, the media used for lubrication are exposed to the electrical discharges and may be damaged or destroyed. Shaft earthing rings are known, for example, from JP S60-167263 U, DE 10 2013 000 982 B4 and DE 10 2014 010 269 B4. By using an electrically conductive non-woven fabric for the material of the earthing element, it is permeable to air and prevents the occurrence of disadvantageous pressure differences axially on both sides of the shaft earthing ring. However, the air permeability of the non-woven fabric reduces the electrical conductivity of the earthing element, which works against the equipotential bonding function of the shaft earthing ring.

JP 2015-207533 A discloses a shaft earthing ring having a brush ring with conductive fibres.

DE 10 2019 133 886 A1 discloses a dissipating apparatus for an electric drive, comprising a carrying body device and a contact device, the dissipating apparatus having at least one opening which forms an air passage in an axial direction, with a carrier part and a holding part of the carrying body device being interconnected in at least one connection region by means of a shaping process.

BRIEF SUMMARY OF THE INVENTION

The problem addressed by the invention is that of providing a shaft earthing ring in which, on the one hand, the occurrence of disadvantageous pressure differences axially on both sides of the shaft earthing ring is effectively prevented, without thereby impairing the equipotential bonding function of the shaft earthing ring.

The invention solves this problem by means of the features of claim 1. Accordingly, the metal support body has at least one ventilation opening which makes it possible to ventilate a housing interior while bypassing the earthing element. The at least one ventilation opening in the metal support body effectively prevents the occurrence of disadvantageous pressure differences axially on both sides of the shaft earthing ring. Since the ventilation function does not have to be provided by the earthing element, the material of the earthing element can be optimally selected with regard to the electrical equipotential bonding function.

In particular, the earthing element can be advantageously designed to be impermeable to air in order to increase the electrical conductivity compared to the non-woven fabric from the prior art. The advantageously closed, air-impermeable design of the earthing element is mechanically and chemically more robust than conventional brush bodies, especially when operated in oil or if the direction of rotation is reversed.

The earthing element is preferably an electrically conductive, elastically deformable annular disc and can also be referred to as an earthing disc. The earthing element is preferably in one piece. This embodiment is much easier to manufacture than conventional brush bodies, and the electrical conductivity can also be improved.

The design of the earthing element as a closed annular disc makes it possible for the earthing element to advantageously perform a sealing and/or protective function, i.e. to seal off an interior from an exterior and/or to protect it from contamination. Preferred applications are electrically driven motor vehicles and, in general, electric drives in which a sealing and/or dirt exclusion function is desired at an interface on a shaft.

The ventilation opening is advantageously arranged radially outside of the earthing element so that the earthing element does not cover the ventilation openings and their function is not impaired by the earthing element. In some embodiments, the earthing element may therefore not be supported on the motor housing or on a cylindrical flange of the shaft earthing ring that interacts with said housing. In order to nevertheless hold the earthing element in a desired position in the shaft earthing ring, in particular centred relative to the shaft, the shaft earthing ring preferably has at least one holding and/or centring element which is arranged and designed to hold the earthing element in a desired position in the shaft earthing ring, in particular centred relative to the shaft. The holding and/or centring element can preferably be formed in one piece with and/or from the support body in order to minimise the number of parts. According to the above, the holding and/or centring element is preferably arranged on the outer circumference of the earthing element so that the holding and/or centring element can assume the supporting function of the motor housing or a cylindrical flange of the shaft earthing ring that interacts with said housing.

The earthing element is preferably attached to the support body via an adhesive, in particular an electrically conductive adhesive. This can be achieved, for example, by using conductive particles or fibres in an adhesive base material. The electrical and/or mechanical attachment of the earthing element to the support body can be achieved effectively and inexpensively by means of an adhesive. Additionally or alternatively, other forms of attachment are possible. For example, the earthing element can be fastened to the support body by means of metal rivets.

In an advantageous embodiment, the shaft earthing ring comprises a preferably electrically conductive, in particular metal clamping ring for clamping the earthing element to the support body. The clamping ring presses the earthing element against the support body and thus ensures a better electrical attachment of the earthing element to the support body. To further improve the electrical contact, the clamping ring preferably has at least one electrically conductive penetration element which penetrates into the earthing ring in the assembled state. Additionally or alternatively, the support body can have at least one electrically conductive, protruding penetration part which penetrates into the earthing ring in the assembled state. In further embodiments, the support body has, on its inner circumference, at least one electrically conductive extension which contacts the earthing element in the assembled state, in particular in a transition portion between an attachment portion and a contact portion of the earthing element. This can also improve the electrical contact between the earthing element and the support body.

The material of the earthing element advantageously comprises a base material and an electrically conductive filler distributed therein. The base material preferably consists of a fluoropolymer such as PTFE, FKM, an elastomer or fluorinated thermoplastic. The filler can preferably comprise metal, metallised and/or metal-coated particles, fibres and/or hollow spheres, conductive carbon black, nanotubes, in particular hollow fibre or carbon nanotubes, and/or conductive fibres, for example carbon fibres.

In an advantageous embodiment, the shaft earthing ring is designed to exert a spring preload on the earthing element in order to counteract for example age-related relaxation of the earthing element and thus a deterioration in the electrical contact with the support body. The spring preload can preferably be generated by means of at least one spring element which, in a preferred embodiment, can be formed by the clamping ring described above.

In some advantageous embodiments, the ventilation opening is a through-hole through a radial portion of the support body. In other advantageous embodiments, the ventilation opening is an axial groove on the outer circumference of the support body. This can be easier to produce than the previously described embodiments. In addition, centring elements for the earthing element can be dispensed with in this embodiment, since the air-impermeable earthing element can be supported with its outer edge on the support body, in particular a cylindrical outer flange thereof.

The surface of the earthing element or earthing lip facing the shaft can be unstructured or smooth in some embodiments. In other embodiments, the surface of the earthing element facing the shaft can be structured or can have structures in order to reduce the frictional power. The structures can preferably be closed, for example concentric, annular elevations such as ridges and/or depressions such as grooves.

In a further advantageous embodiment, the earthing element has an electrically conductive surface coating in addition to or as an alternative to a conductive main body. In this way, a significant increase in the conductivity of the earthing element can be achieved.

The coating can preferably be a metal coating, for example based on copper, silver, gold, tin, aluminium or other metals or alloys. It is also possible to combine multiple layers of metals. In addition, metals or semiconductors can also be combined with non-metal conductive components.

The coating can be based on non-metal conductive materials such as graphene, graphite, carbon nanoparticles, carbon fibres, conductive carbon black or conductive polymers such as polyaniline or its derivatives, in particular without a cohesive matrix. In addition, metals can also be incorporated into these layers, e.g. metallised graphite.

The coating can be rendered conductive by metal components that are integrated in a matrix, for example conductive lacquers with metal fillers such as copper, silver, gold, tin, or other metals or their alloys. The coating can be rendered conductive by non-metal conductive components that are integrated in a matrix, for example conductive lacquers with non-metal fillers such as graphene, carbon nanoparticles, carbon fibres and conductive carbon blacks. A conductive polymer such as polyaniline or its derivatives can be used as a matrix for the above-mentioned fillers, but non-conductive polymers or resins are also possible.

The coating can comprise a combination of metal and non-metal conductive components, for example a combination of copper and graphene or copper and polyaniline, advantageously also as corrosion protection for the copper.

Conductive particles are preferably deposited or applied to a main body of the earthing element by chemical, galvanic or physical methods, for example PVD, CVD, ultrasound, jet deposition (jetting) and the like. The surface of the earthing element can be provided with the conductive coating completely or partially, in particular on one side, both sides, or in partial regions of one or both surfaces.

Depending on which metal may be used for the coating, it is possible for the metal to be transferred from the surface of the earthing element to the metal surface on the mating surface of the shaft, which makes it possible for the contact resistance to be reduced under dynamic conditions with low radial forces.

The layer thickness of the electrically conductive layer is preferably in the range between one atomic layer and a maximum of 0.3 mm.

DESCRIPTION OF THE FIGURES

The invention will be explained below on the basis of preferred embodiments with reference to the accompanying drawings, in which:

FIG. 8 is a plan view of an earthing ring according to the second embodiment from the housing interior;

FIG. 9-11 are sectional views of the earthing ring along the lines A-A, B-B and C-C in FIG. 8;

FIG. 21 is a perspective view of an earthing ring according to a fifth embodiment;

FIG. 22 is a plan view of an earthing ring according to the fifth embodiment from the housing interior;

FIGS. 23 and 24 are sectional views of the earthing ring along the lines A-A and C-C in FIG. 22;

DETAILED DESCRIPTION OF THE INVENTION

Figure 1:
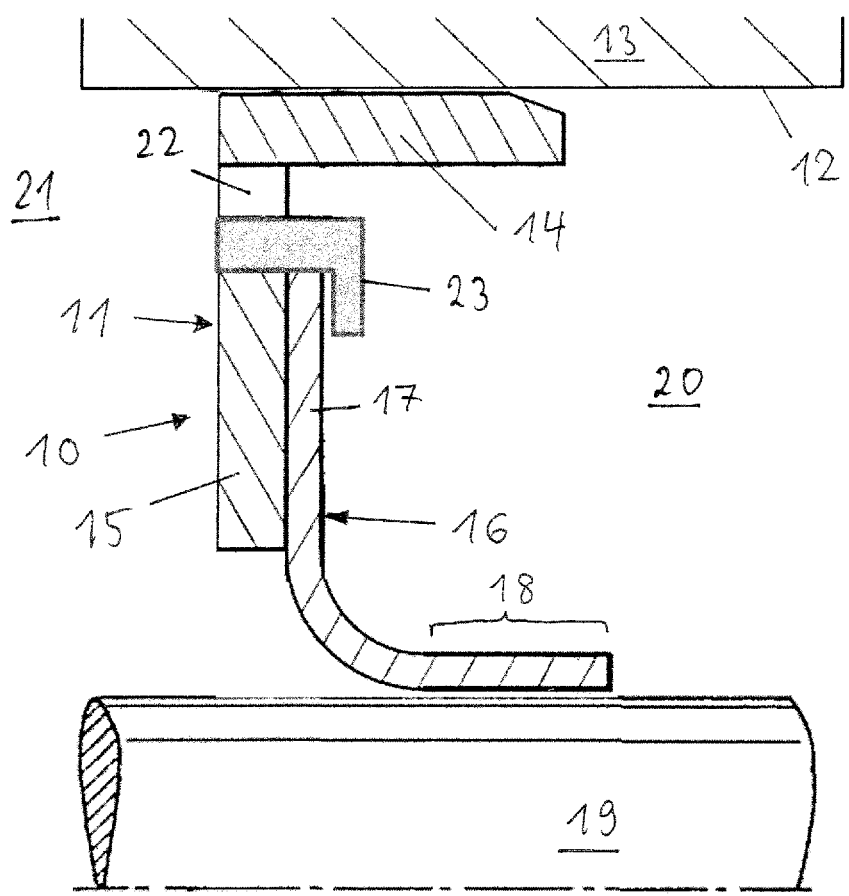
FIG. 1 is a schematic cross-sectional view through an assembled earthing ring in a first embodiment.
Figure 2:
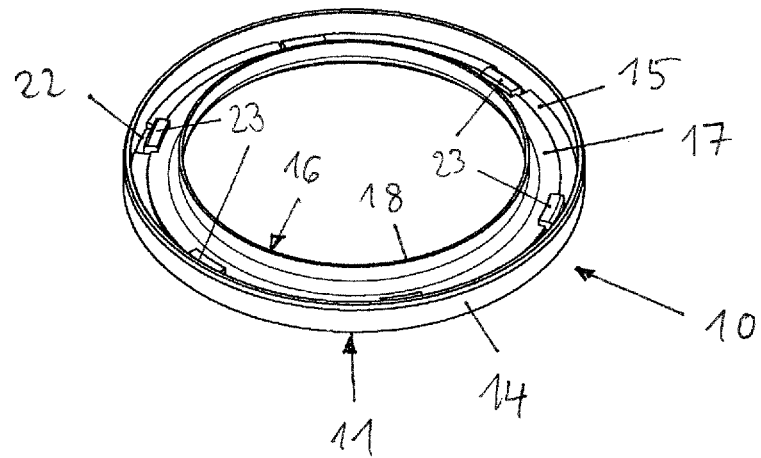
FIG. 2 is a perspective view of an earthing ring according to the first embodiment.
Figure 3:
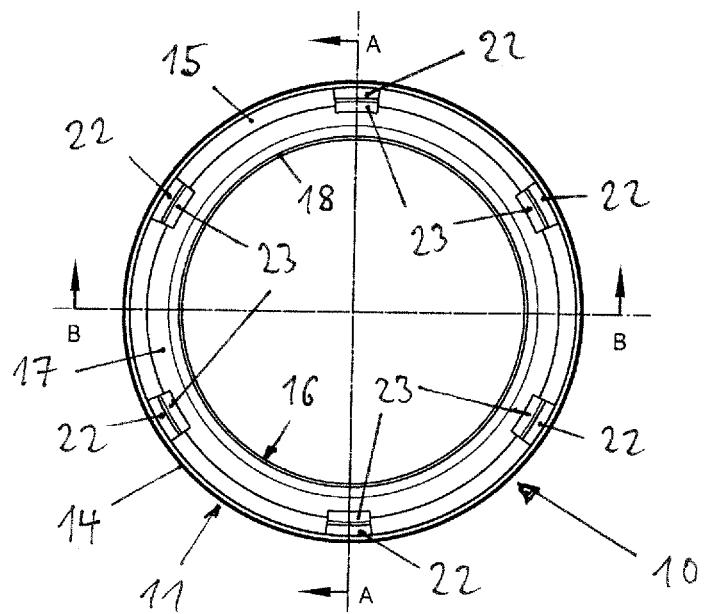
FIG. 3 is a plan view of an earthing ring according to the first embodiment from the housing interior.
Figure 4:
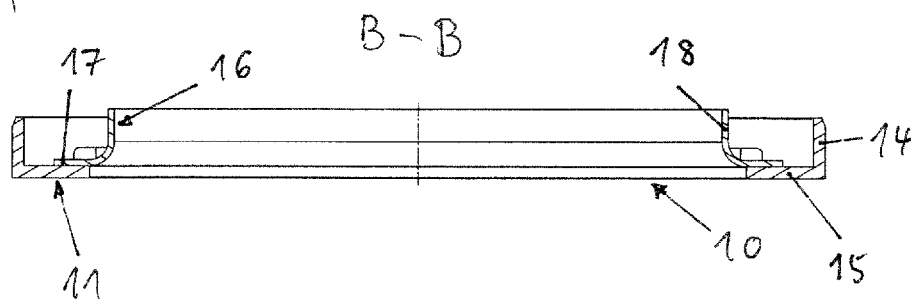
FIGS. 4 and 5 are sectional views of the earthing ring along the lines B-B and A-A in FIG. 3.
Figure 5:
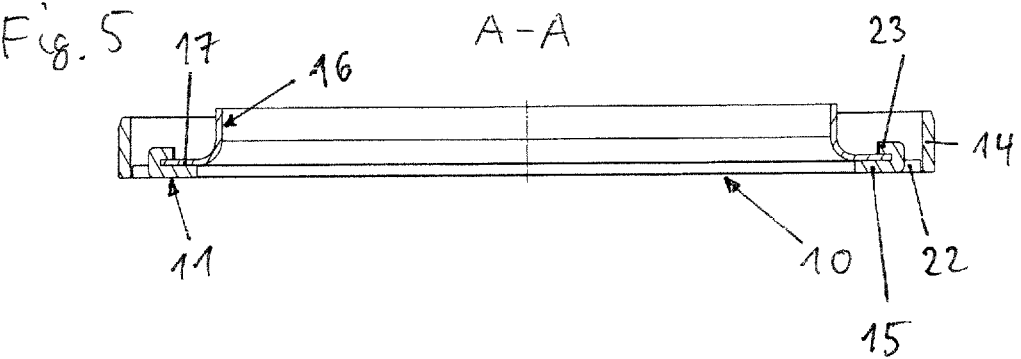

The earthing ring 10 comprises a metal support body 11 which can be inserted into a cylindrical bore 12 in a housing 13 of an electric motor, and an earthing element 16. For this purpose, the support body 11 has a cylindrical flange 14 on its outer circumference, the outer diameter of which flange corresponds to the inner diameter of the cylindrical bore 12. The support body 11 also has a radial carrying portion 15 which, starting from the cylindrical flange, extends radially inwards and is used to hold the earthing element 16 connected thereto.

The earthing element 16 is an electrically conductive, elastically deformable annular disc and can also be referred to as an earthing disc. The earthing element 16 is thus disc-shaped in a pre-assembly state and is elastically deformed during assembly in order to rest with its contact portion 18 over an axial length on the shaft 19 to be sealed, as shown in FIG. 1.

The earthing element 16 is made of an electrically conductive and elastic material, or has at least one electrically conductive material and at least one elastic material. A combination of materials or a mixture of materials is also possible, for example consisting of a conductive and a non-conductive material.

In the unassembled state, the earthing element 16 has the shape of an annular disc, for example. The earthing element 16 has an outer radial attachment portion 17 by means of which the earthing element 16 is connected to the support body 11 or to the carrying portion 15 in a planar and electrically conductive manner. The earthing element 16 also has an inner cylindrical contact portion 18 which, in the assembled state, preferably lies flat on a rotary shaft 19 of the electric motor and thus is preferably in planar contact therewith, as can be seen in FIG. 1. Planar contact is not absolutely necessary; it is generally sufficient if the earthing element 16 rests on the shaft 19 with only one edge. In the assembled operating state, the earthing element 16 having the contact portion 18 is preferably curved inwards relative to the interior 20, as shown in FIG. 1. Alternatively, the earthing element 16 can also be curved outwards. The earthing element 16 can also be referred to as an earthing lip.

The material of the earthing element 16 advantageously comprises a base material and an electrically conductive filler distributed therein. The base material is advantageously PTFE (polytetrafluoroethylene) or another fluoropolymer such as FKM (fluororubber), a simple elastomer such as ACM, AEM, HNBR or NBR, or fluorinated thermoplastic. The electrically conductive filler preferably comprises metal, metallised and/or metal-coated particles, fibres and/or hollow spheres, conductive carbon black, nanotubes, in particular hollow fibre or carbon nanotubes, and/or conductive fibres, for example carbon fibres.

Due to the electrically conductive contact between the electrically conductive earthing element 16 and the shaft 19, the electrical attachment of the earthing element 16 to the metal support body 11 and the electrically conductive contact between the support body 11 and the e.g. metal housing 13, there is a continuous electrically conductive connection between the shaft 19 and the housing 13. In this way, the earthing ring 10 establishes equipotential bonding between the shaft 19 and the housing 13 in every operating state of the electric motor.

In order to ventilate an interior 20 within the housing 13, the support body 11 has at least one ventilation opening 22 which allows air to pass from the housing interior 20 to an exterior 21 and thus allows ventilation of a housing interior 20 while bypassing the earthing element 16. The material of the earthing element can therefore preferably be impermeable to air, which can be advantageous for the earthing properties of the earthing element 16. Preferably, a plurality of ventilation openings 22 are provided which are in particular at equal angular distances from one another and are arranged around the circumference of the earthing element 16. In the embodiment of FIGS. 2 to 5, for example six ventilation openings 22 are provided, but the number of ventilation openings 22 may also be more or fewer than six. The ventilation openings 22 can be provided in the radial carrying portion 15, as in the embodiment according to FIGS. 1 to 5.

The ventilation openings 22 are advantageously arranged radially outside of the earthing element 16. The outer diameter of the earthing element 16 is advantageously smaller than the inner diameter of the housing bore 12 and advantageously also smaller than the inner diameter of the cylindrical flange 14 in order to leave the ventilation openings 22 clear.

In this embodiment, at least one holding and/or centring element 23, in particular with an angular cross section, is provided on the support body 11, and advantageously a plurality of such holding and/or centring elements 23 are provided which, in this embodiment, embrace or clasp the earthing element 16 from the outside, as shown in FIG. 1, in order to hold the earthing element 16 in a desired, in particular central position. The holding/centring elements 23 are preferably arranged at equal angular distances from one another around the circumference of the earthing element 16. The number of holding/centring elements 23 can correspond to the number of ventilation openings 22 or can be different. The circumferential position of the holding/centring elements 23 can correspond to the circumferential position of the ventilation openings 22 or can be arranged in between.

In a particularly advantageous embodiment, the holding/centring elements 23 are formed by the material of the support body 11 that is cut out for the ventilation openings 22, as in the case of FIGS. 1 to 5. A holding/centring element 23 is thus cut out e.g. from the material of the support element 11 or the carrying portion 15 (such as sheet steel) and the resulting tab is flanged around the outside of the earthing element 16. Thus, the holding/centring element 23 and a corresponding ventilation opening 22 are created at the same time. Advantageously, a conductive connection can be established by penetration of the flanged material into the earthing lip 16. Therefore, the flanged
holding/centring element 23 can also be referred to as end ring parts in this embodiment.

In an embodiment that is not shown, a holding/centring element extending continuously around the circumference of the earthing ring 16 can be provided.

The at least one holding/centring element 23 is preferably formed in one piece with and from the support body 11.

In the embodiment according to FIGS. 6 to 11, the earthing element 16 is connected to the support body 11 via conductive adhesive (shown only in FIG. 6), which is preferably applied in a planar manner between the carrying portion 15 and the attachment portion 17. The adhesive 24 can be e.g. a conductive elastomer mixture or a conductive adhesive tape. Conductive epoxy resin or duroplastic adhesive 24 is also conceivable, as is any other known and suitable adhesive. Adhesive 24 can also be additionally provided in the other embodiments.

In order to keep the earthing element 16 in a desired, in particular central position, at least one centring element 25, advantageously a plurality of centring elements 25, is provided on the support body 11 in this embodiment. The centring elements 25 are preferably arranged at equal angular distances from one another around the circumference of the earthing element 16. The number of centring elements 25 can correspond to the number of ventilation openings 22 or can be different. The centring elements 25 are preferably arranged in the circumferential direction, for example centrally between the ventilation openings 22, as can best be seen from FIG. 8. The centring elements 25 are preferably formed in one piece with the support body 11.

In other embodiments (see for example FIGS. 21 to 23), instead of a plurality of centring elements, one centring element 25 extending continuously around the circumference of the earthing ring 16, for example in the form of a centring edge 38, can be provided.

The at least one centring element 25 can be combined with other ways of fastening the earthing element 16 to the support body 11, so it can also be used advantageously independently of the adhesive 14.

In the embodiment of FIGS. 12 to 17, the shaft earthing ring 10 has a clamping ring 26 which is designed for clamping the earthing element 16 to the support body. The clamping ring 26 is for example U-shaped in cross section and advantageously has a cylindrical outer portion 27, a cylindrical inner portion 28 and a radial connecting portion 29 connecting the cylindrical outer portion 27 to the cylindrical inner portion 28. The outer diameter of the outer portion 27 advantageously corresponds to the inner diameter of the cylindrical flange 14 in order to allow clamping of the clamping ring 26 in the support body 11. In the assembled state, the clamping ring 26, in particular the cylindrical inner portion 28, presses the earthing element 16, in particular the attachment portion 17, against the support body 11, in particular against the carrying portion 15. The earthing element 16 is clamped to the support body 11 in this way. Additional bonding using adhesive 24 is possible.

The clamping ring 26 is advantageously electrically conductive, for example made of metal, in order to contribute to the electrical connection between the earthing element 16 and the support body 11. In order to increase the electrical conductivity between the earthing element 16 and the support body 11, the clamping ring 26, in particular on the cylindrical inner portion 28, can preferably have at least one electrically conductive penetration element 30. For example, the penetration element 30 can consist of a plurality of teeth arranged around the circumference of the clamping ring 26. It is not excluded that the penetration element 30 is formed continuously around the circumference of the clamping ring 26.

The clamping ring 26 forms an interior 31 which is connected to the at least one ventilation opening 22 in a gas-conducting manner. In order to ventilate the interior 31 to the housing interior 20 and thus to establish a continuous flow connection between the housing exterior 21 and the housing interior 20, the clamping ring 26 preferably has at least one ventilation opening 32, in particular in the connecting portion 29. The number and/or circumferential arrangement of the ventilation openings 32 can correspond to the number and/or circumferential arrangement of the ventilation openings 22, but this is not absolutely necessary.

In the third embodiment, too, preferably at least one centring element 25 (see FIG. 17) is provided as in FIGS. 6 to 11 in order to hold the earthing element 16 in a desired, in particular central position, which can be particularly useful before mounting the clamping ring 26.

Figure 18:
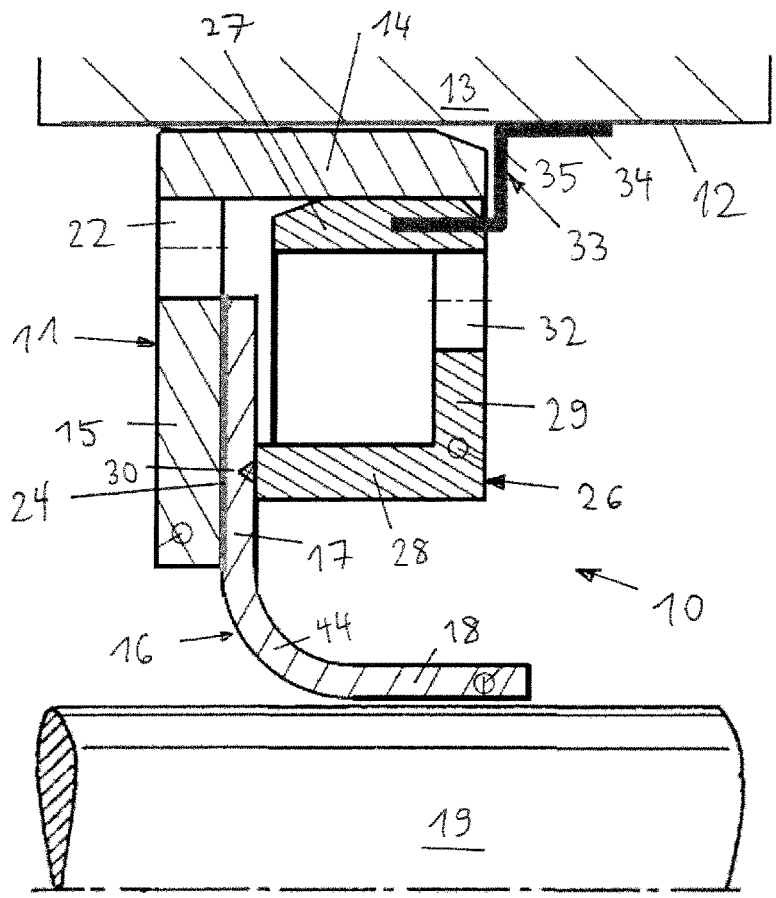
FIG. 18 is a schematic cross-sectional view through an assembled earthing ring in a fourth embodiment.
Figure 19:
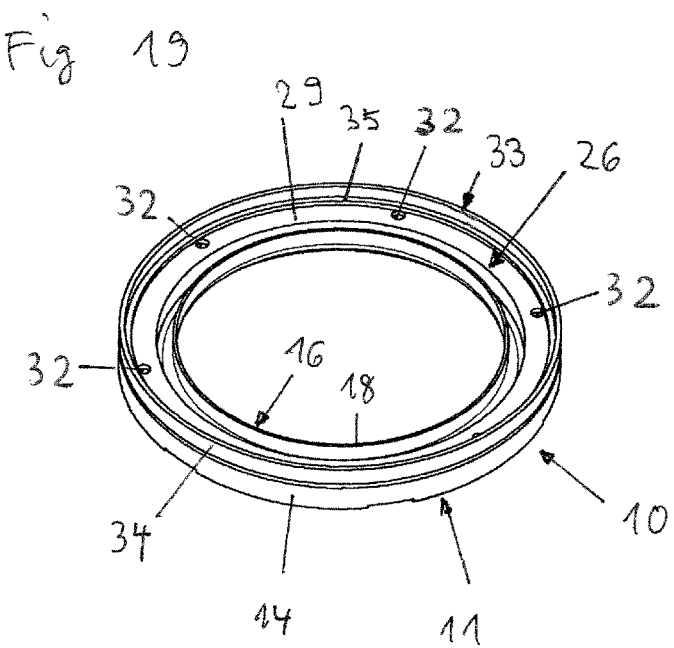
FIG. 19 is a perspective view of an earthing ring according to the fourth embodiment.
Figure 20:
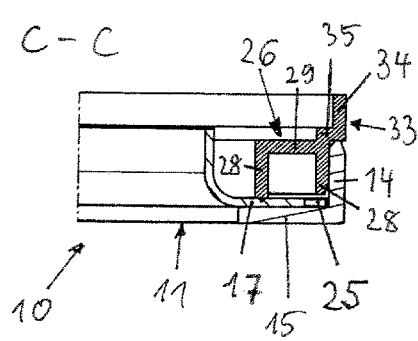
FIG. 20 is a sectional view of the earthing ring from FIG. 19 which is analogous to FIG. 17.

The embodiments according to FIGS. 18 to 20 correspond to the third embodiment according to FIGS. 12 to 17, with a preferably metal contacting element 33 which conductively connects the clamping ring 26 to the housing 13 being additionally provided here. The contacting element 33 can advantageously be formed in one piece with the clamping ring 26. The advantageously circumferential contacting element 33 can have a cylindrical portion 34 for contacting the housing 13 in the region of the cylindrical bore 12 and a radial portion 35 for connecting the remaining clamping ring 26 to the cylindrical portion 34.

The fifth embodiment according to FIGS. 21 to 23 corresponds to the third embodiment according to FIGS. 12 to 17, with the clamping ring 26 in this case additionally comprising at least one spring element 37 which counteracts an e.g. age-related relaxation of the earthing element 16 in order to ensure a reliable electrical connection between the earthing element 16 and the support body 11 at all times. A plurality of spring elements 37 arranged in particular regularly around the circumference of the clamping ring 26 are preferably provided. The view B-B in FIG. 22 corresponds approximately to FIG. 15.

In a particularly advantageous embodiment, the spring elements 37 are formed by the material of the clamping ring 26 that is cut out for the ventilation openings 32, as in the case of FIGS. 21 to 23. A spring element 37 is thus cut out e.g. from the material of the clamping ring 26 or the connecting portion 29 (such as sheet steel) and the resulting tab is angled inwards, i.e. into the interior 31 of the clamping ring 26. Thus, the spring element 37 and a corresponding ventilation opening 32 are created at the same time.

Figure 25:
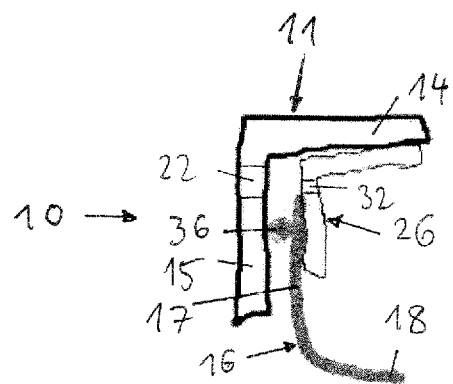
FIG. 25 is a schematic cross-sectional drawing of an earthing ring in a further embodiment.
Figure 26:
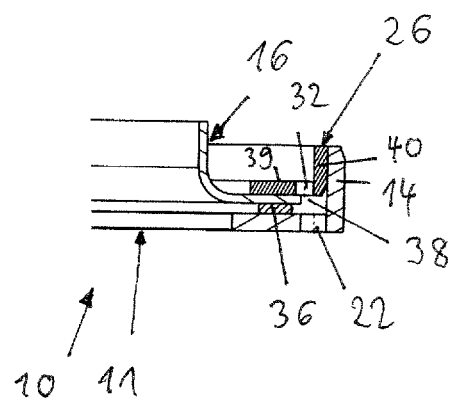
FIG. 26 is a cross-sectional drawing of an earthing ring in the region of the ventilation openings in the embodiment according to FIG. 25.

In a further embodiment according to FIGS. 25 and 26, the clamping ring 26 is for example angular in cross section, with a radial leg 39 which faces the attachment portion 15, and an axial leg 40 which corresponds to the cylindrical outer portion 27 in the third to fifth embodiment. In this or other embodiments with a clamping ring 26, a sealing element 36, preferably made of an elastomer, for example an O-ring, can be provided between the earthing element 16, in particular the attachment portion 17, and the support body 11, in particular the carrying portion 15.

Figure 27:
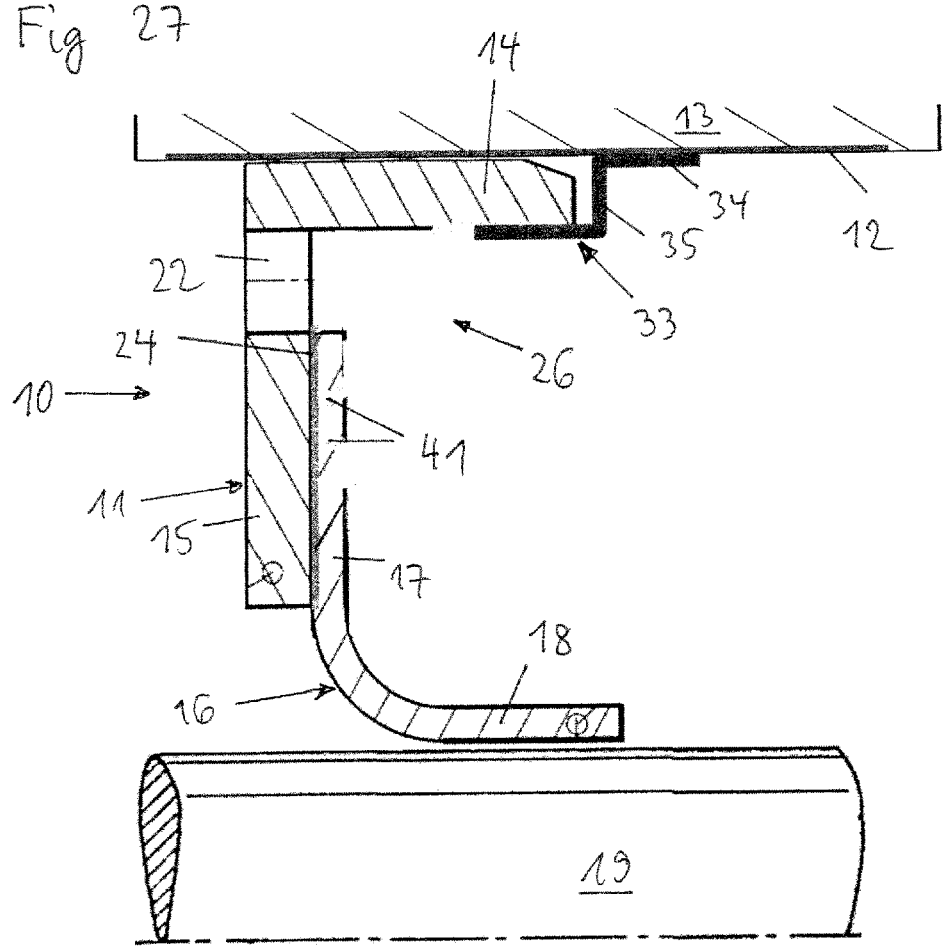
FIG. 27 is a schematic cross-sectional view through an assembled earthing ring in a sixth embodiment.
Figure 28:
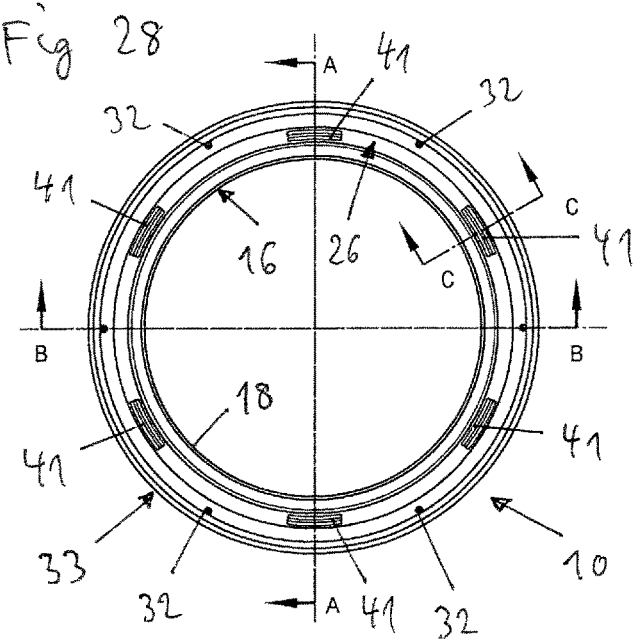
FIG. 28 is a plan view of an earthing ring according to the sixth embodiment from the housing interior.
Figure 29:
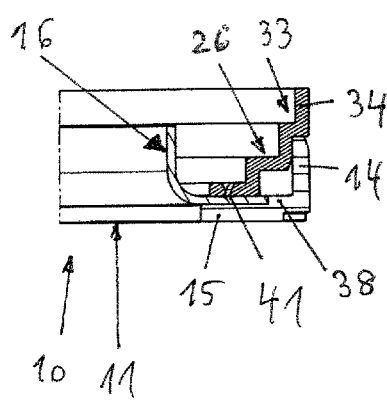
FIG. 29 is a sectional view of the earthing ring along the line C-C in FIG. 28.

In a sixth embodiment according to FIGS. 27 to 29, a clamping ring 26 is again provided which has metal, protruding penetration parts 41 which penetrate into the earthing element 16, in particular the attachment portion 17, when the earthing ring 10 is in the assembled state. The end ring parts 41 may be in the form of sharp edge portions or wings bent up from a single- or multi-slotted region of the clamping ring 26, for example. As can be seen from FIG. 28, a plurality of penetration parts 41 distributed over the circumference of the clamping ring 26 are advantageously provided.

In the embodiment according to FIGS. 27 to 29, the clamping ring 26 has a contacting element 33 as described in connection with FIGS. 18 to 20. Embodiments having penetration parts 41 but without a contacting element 33 are possible.

Figure 30:
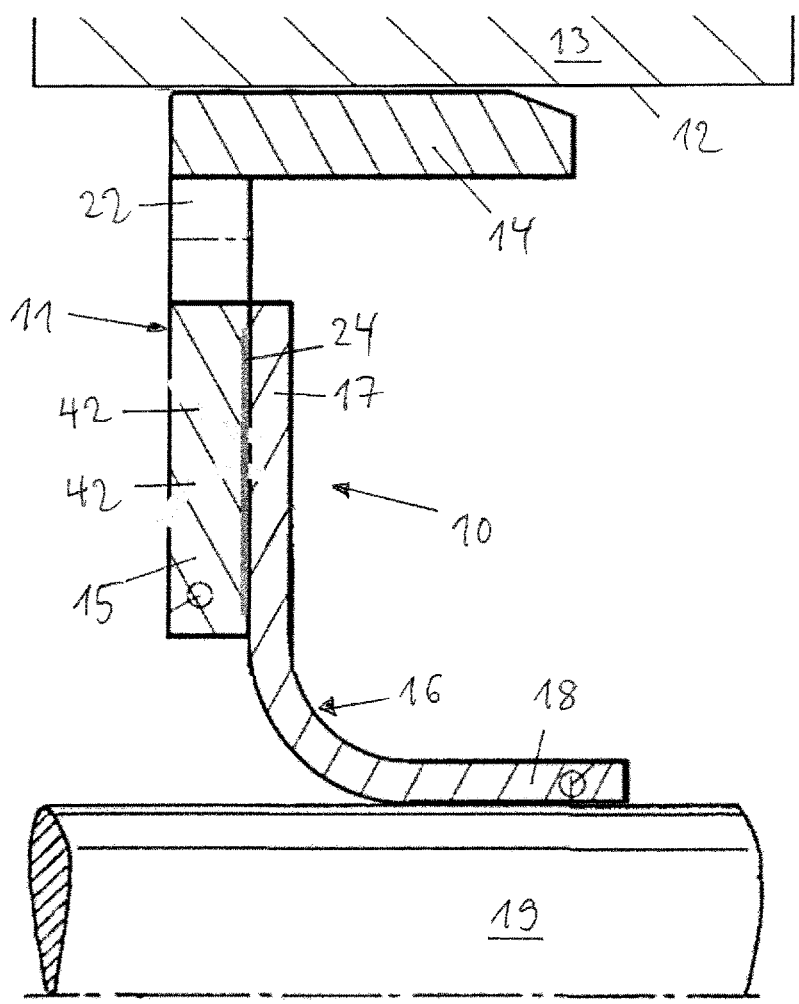
FIG. 30 is a schematic cross-sectional view through an assembled earthing ring in a seventh embodiment.
Figure 31:
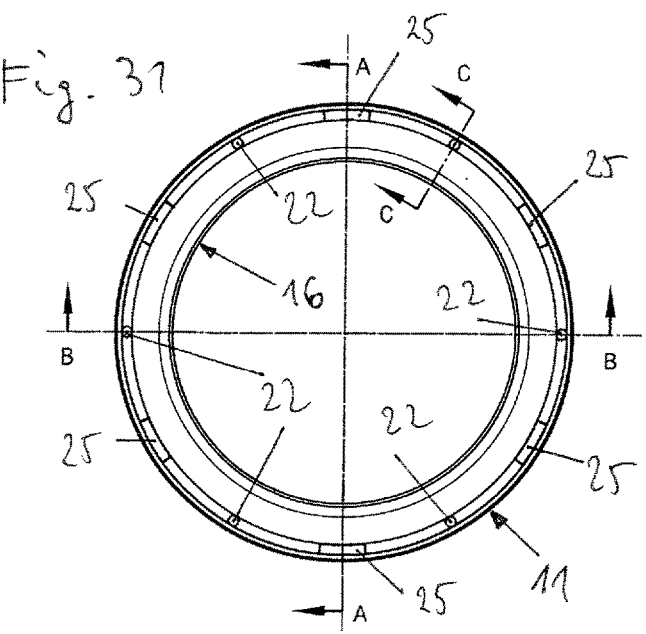
FIG. 31 is a plan view of an earthing ring according to the seventh embodiment from the housing interior.
Figure 32:
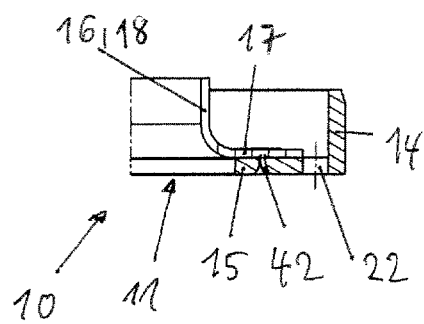
FIG. 32 is a sectional view of the earthing ring along the line C-C in FIG. 31.

Metal protruding penetration parts 42 are also provided in a seventh embodiment according to FIGS. 30 to 32. In this embodiment, however, these are formed by the metal support body 11, in particular the carrying portion 15, and therefore penetrate the earthing element 16, in particular the attachment portion 17, from the other side with respect to the sixth embodiment.

Figure 33:
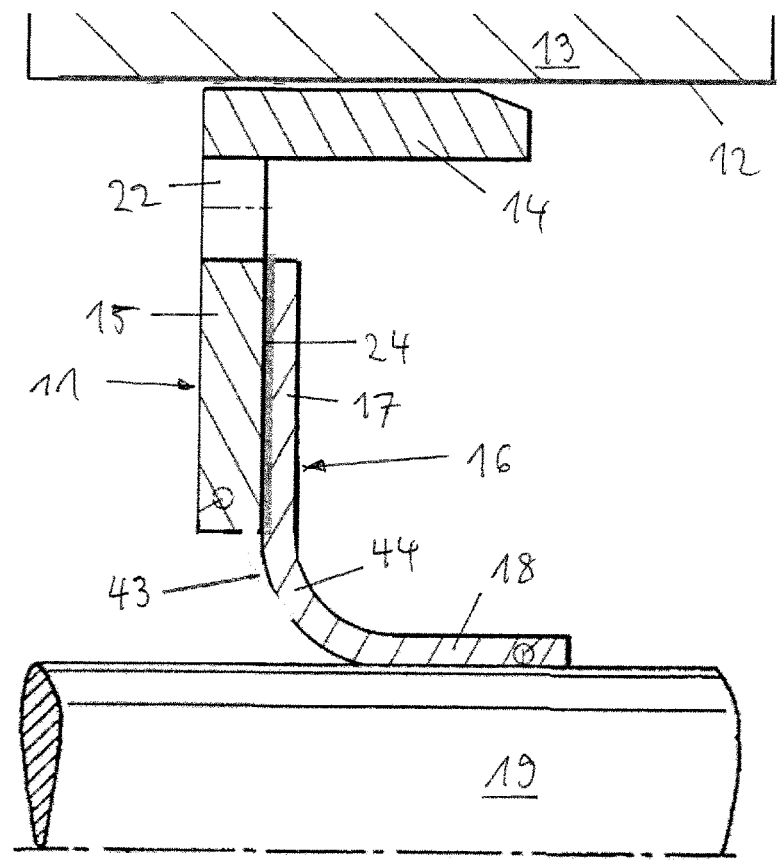
FIG. 33 is a schematic cross-sectional view through an assembled earthing ring in an eighth embodiment.
Figure 34:
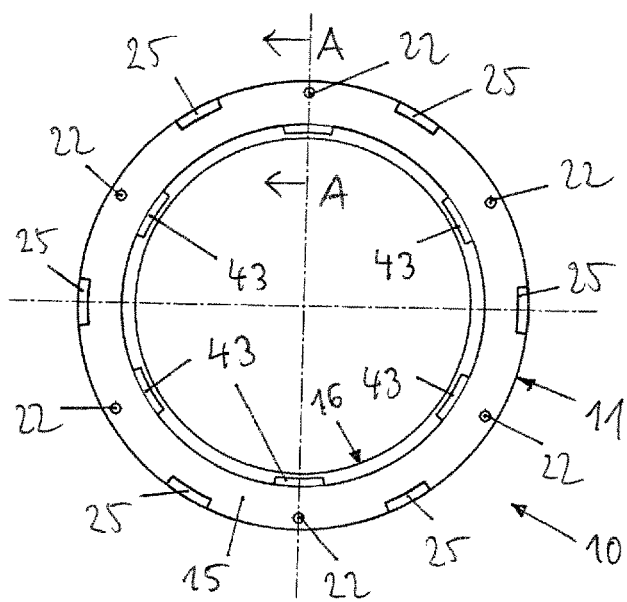
FIG. 34 is a plan view of an earthing ring according to the eighth embodiment from the housing exterior.
Figure 35:
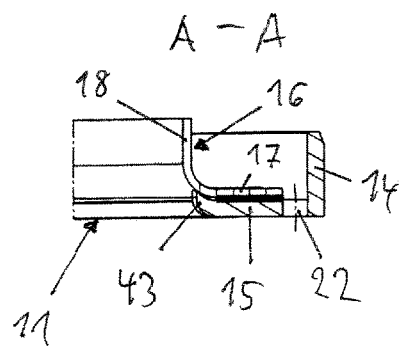
FIG. 35 is a sectional view of the earthing ring along the line A-A in FIG. 34.

In an eighth embodiment according to FIGS. 33 to 35, metal extensions 43 are provided on the inner circumference of the support body 11 or the carrying portion 15, in particular in the form of tabs, which, when the earthing ring 10 is in the assembled state, provide contacting support for the earthing element 16, in particular in the curved transition portion 44 between the attachment portion 17 and the contact portion 18.

Figure 36:
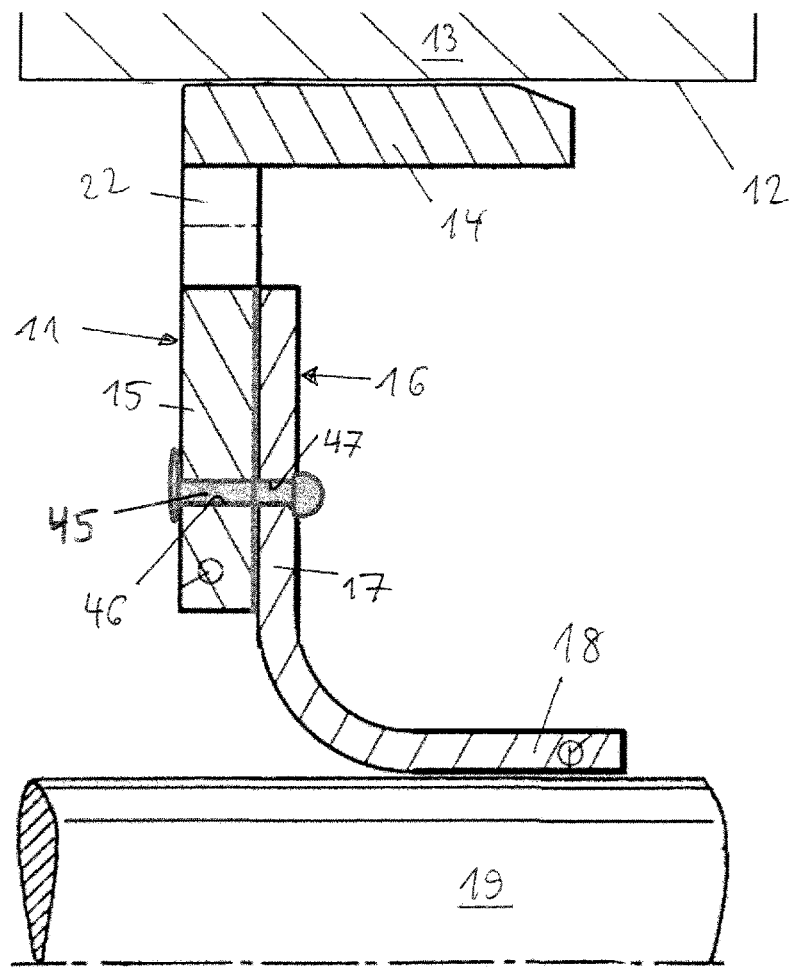
FIG. 36 is a schematic cross-sectional view through an assembled earthing ring in a ninth embodiment.
Figure 37:
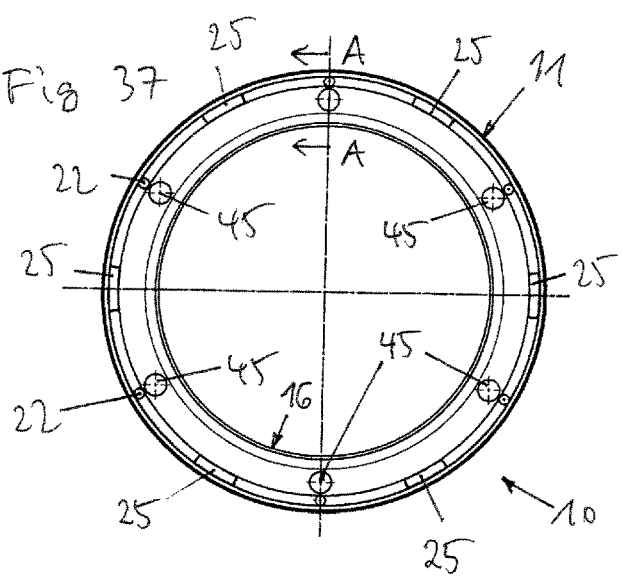
FIG. 37 is a plan view of an earthing ring according to the ninth embodiment from the housing interior.
Figure 38:
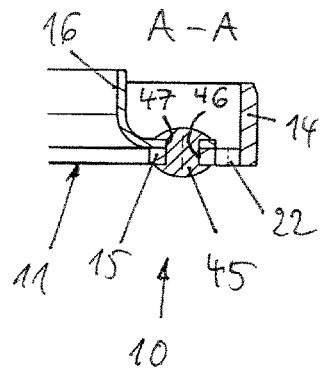
FIG. 38 is a sectional view of the earthing ring along the line A-A in FIG. 37.

In a ninth embodiment according to FIGS. 36 to 38, a plurality of metal rivets 45 are distributed over the circumference of the earthing ring 10, which rivets engage through a corresponding bore 47 in the earthing element 16, in particular in the attachment portion 17, and through a corresponding bore 46 in the support body 11, in particular in the carrying portion 15, thereby establishing an electrically conductive riveted connection between the earthing element 16 and the support body 11.

Figure 39:
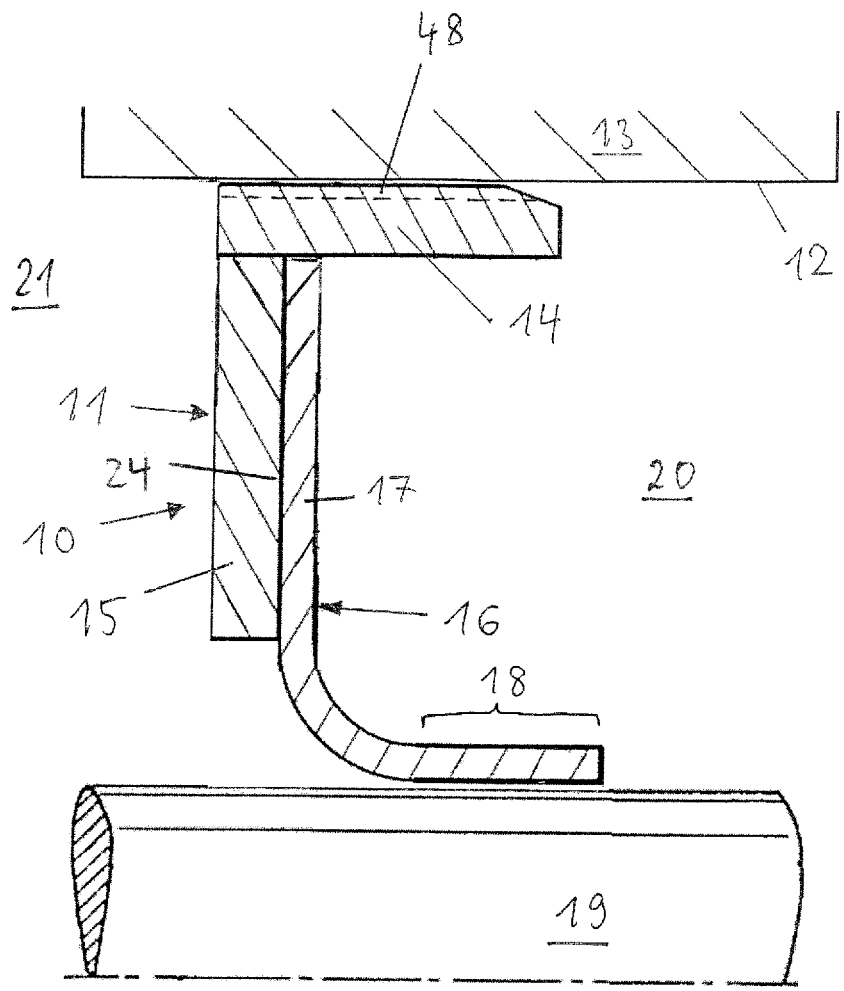
FIG. 39 is a schematic cross-sectional view through an assembled earthing ring in a further embodiment.

In the embodiment according to FIG. 39, instead of a through-hole 22 through the radial carrying portion 15 of the support body 11, at least one axial ventilation groove 48 is provided in the outer circumference of the support body 11, in particular of the flange 14. This can be easier to produce than the previously described embodiments. In addition, centring elements for the earthing element 16 are not required in this embodiment, since the air-impermeable earthing element 16 can be supported with its outer edge on the support body 11, in particular the flange 14.

Figure 6:
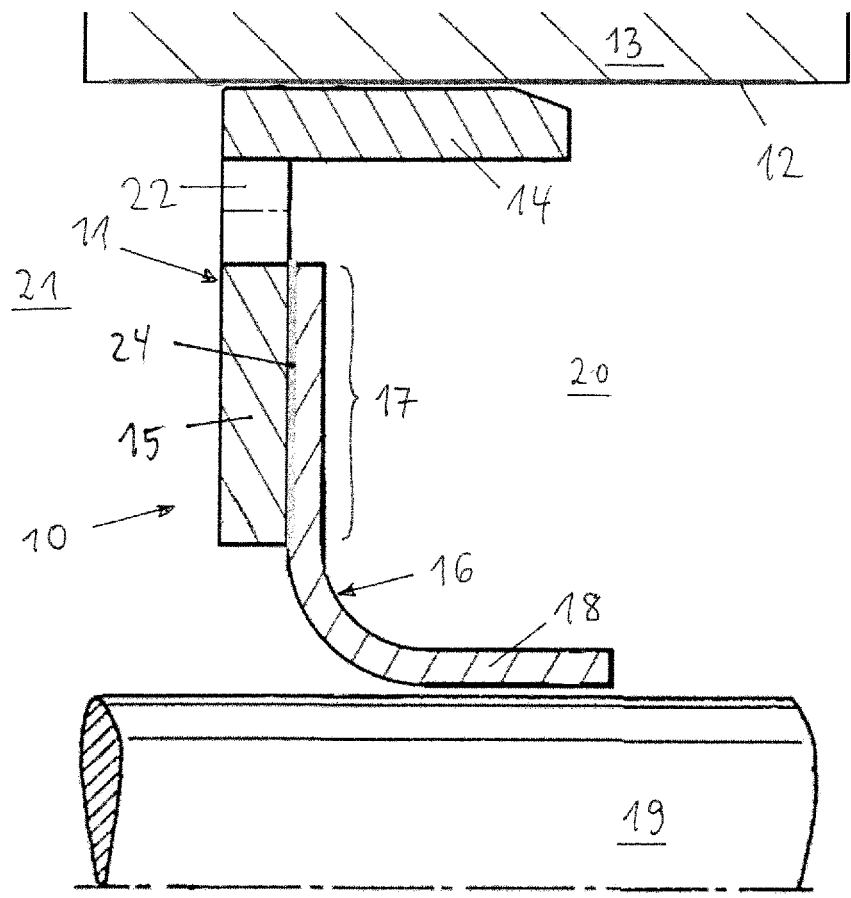
FIG. 6 is a schematic cross-sectional view through an assembled earthing ring in a second embodiment.
Figure 7:
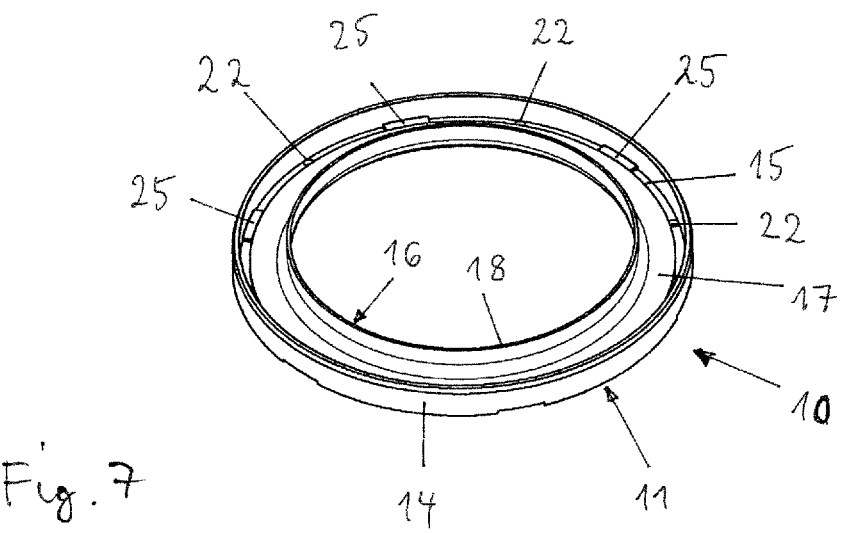
FIG. 7 is a perspective view of an earthing ring according to the second embodiment.
Figure 12:
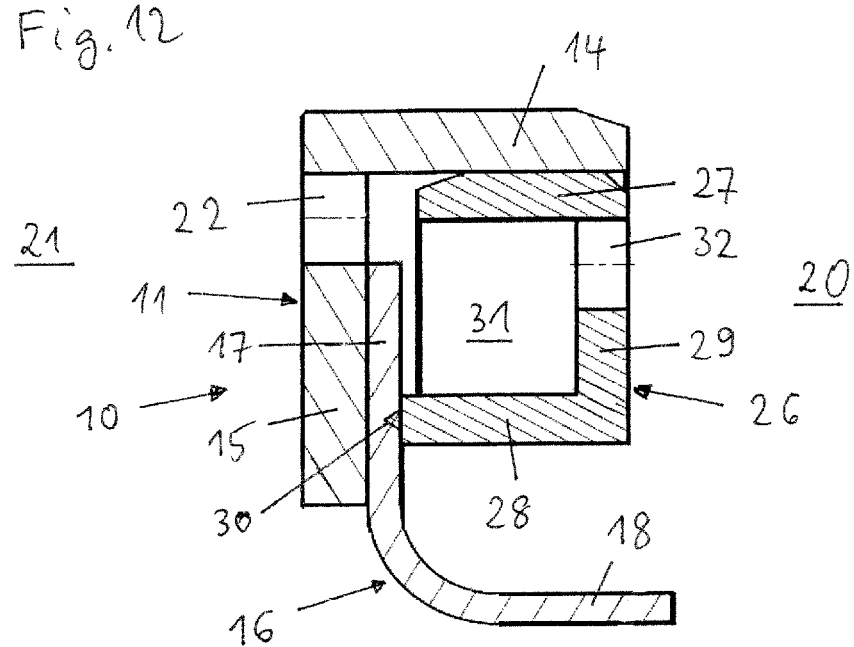
FIG. 12 is a schematic cross-sectional view through an assembled earthing ring in a third embodiment.
Figure 13:
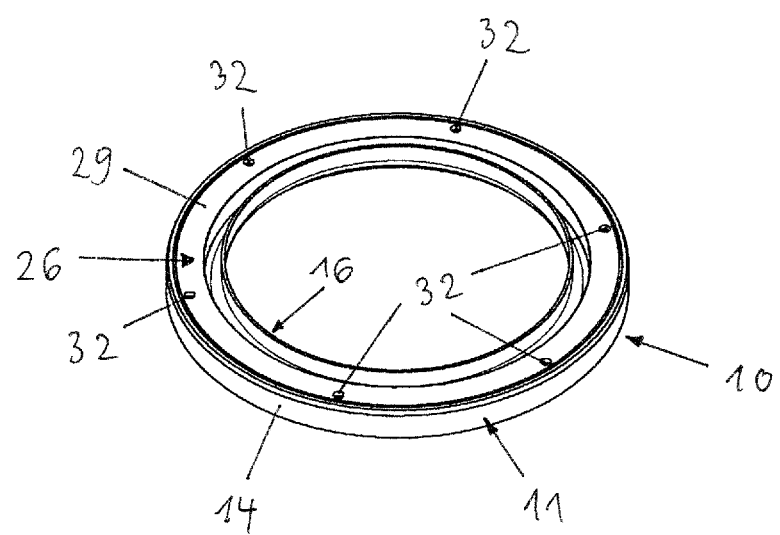
FIG. 13 is a perspective view of an earthing ring according to the third embodiment.
Figure 14:
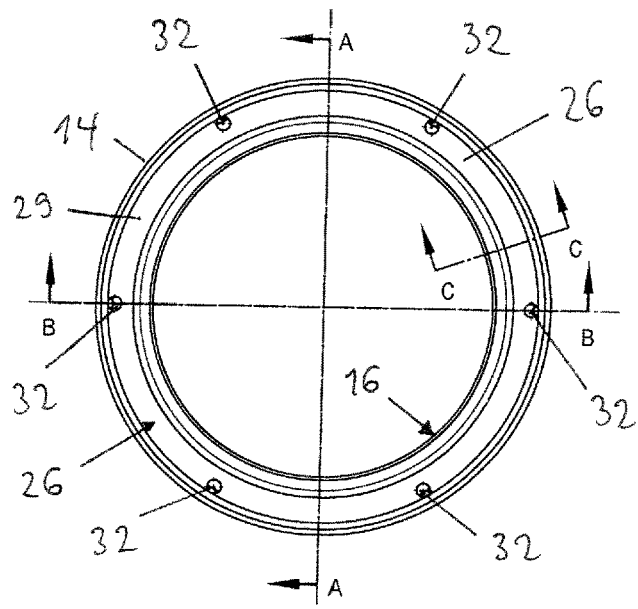
FIG. 14 is a plan view of an earthing ring according to the third embodiment from the housing interior.
Figure 15:
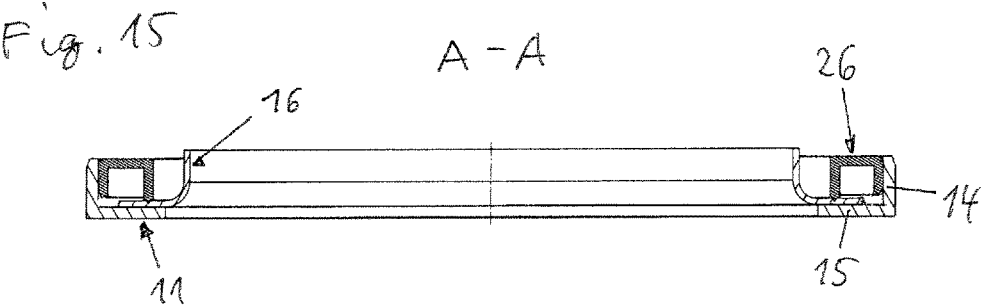
FIG. 15-17 are sectional views of the earthing ring along the lines A-A, B-B and C-C in FIG. 14.
Figure 16:
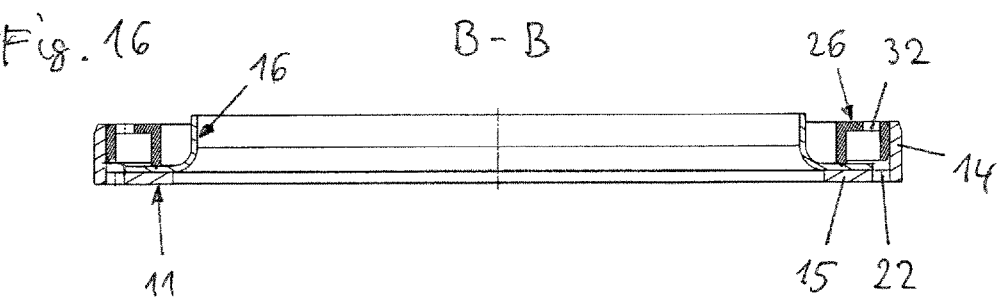
Figure 17:
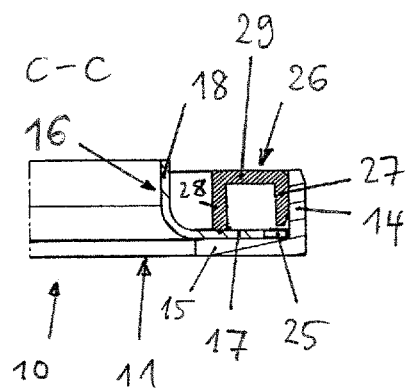

All of the described embodiments can optionally have an adhesive 24, as described in connection with FIG. 6.

The shape of the ventilation openings 22 may be rectangular (FIG. 3) or circular (FIG. 8, 14, 31, 34, 37) or any other suitable shape. The same applies to the shape of the ventilation openings 32.

Further advantageous embodiments are shown in FIGS. 40 to 44, in which the earthing element 16 has at least one electrically conductive coating 50-57 on the surface of its main body 49. The main body 49 can correspond to the earthing element 16 without a coating 50-57, as has been described above in particular with reference to FIGS. 1 to 39. The main body 49 is preferably electrically conductive, but an electrically non-conductive main body 49 is conceivable. The materials and layer thicknesses of the electrically conductive coating 50-57 are advantageously selected as previously described.

Figure 40:
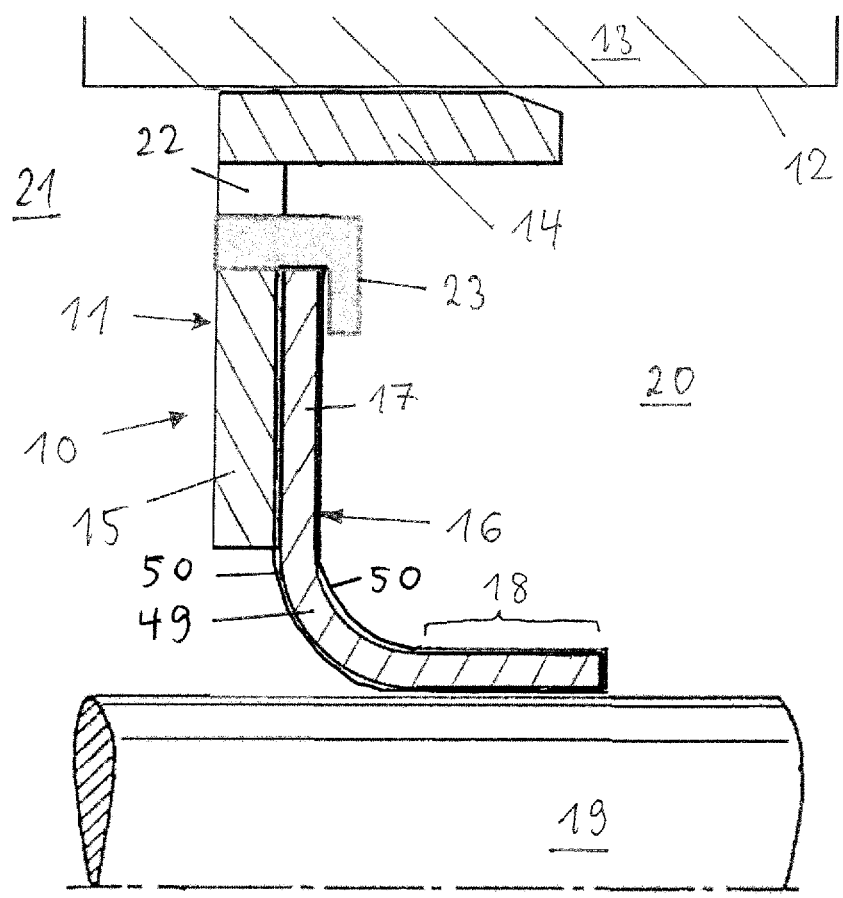
FIGS. 40, 41 and 44 are cross-sectional views through an assembled earthing ring in further embodiments.

FIG. 40 shows an embodiment with an electrically conductive coating 50 applied over the entire surface and on both sides, i.e. on the side facing the exterior 21 and on the side facing the interior 20 of the earthing element.

Figure 41:
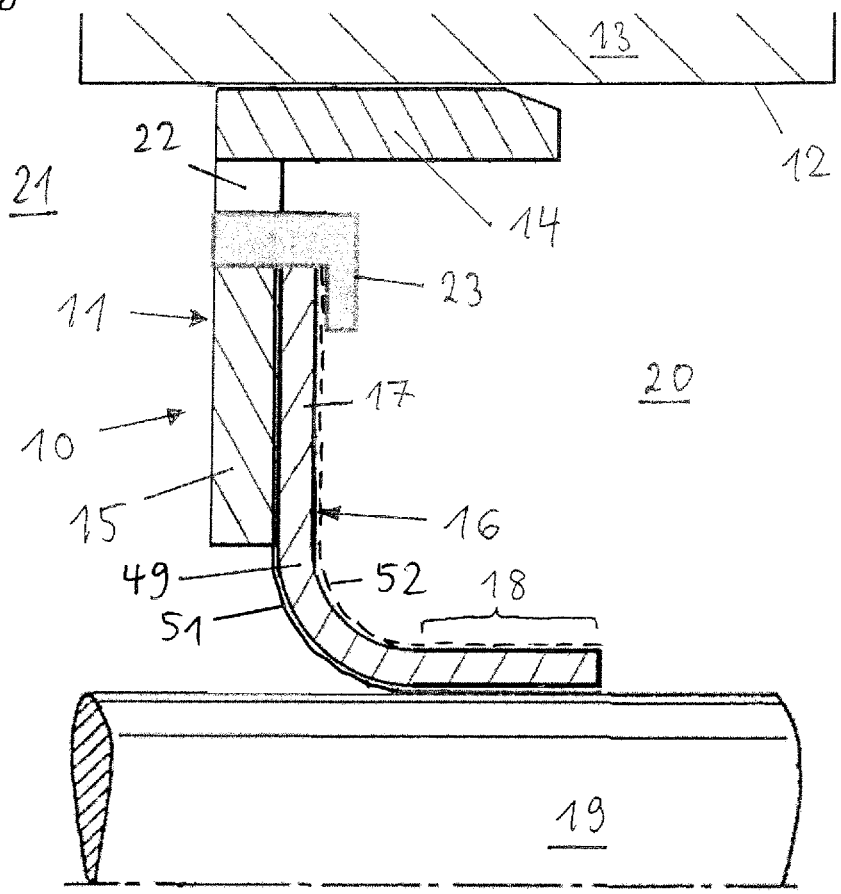

FIG. 41 shows an embodiment with a coating on one side, i.e. an electrically conductive coating 51 applied only on the side facing the exterior 21, or an electrically conductive coating 52 applied only on the side facing the interior 20.

Furthermore, embodiments are possible with a coating on both sides, i.e. an electrically conductive coating 51 applied on the side facing the exterior 21 and an electrically conductive coating 52 applied on the side facing the interior 20, with both coatings 51, 52 differing in terms of material, application pattern and/or layer thickness.

Figure 42:
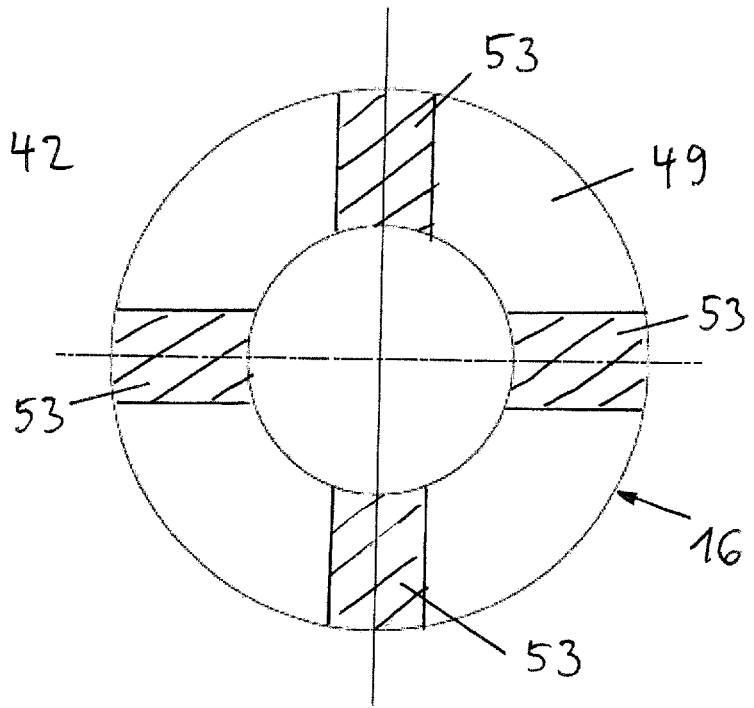
FIGS. 42 and 43 are plan views of an earthing element before assembly.

In FIG. 42, the annular-disc-shaped earthing element 16 is shown in a further embodiment in a pre-assembly state. One or both sides of the earthing element 16 in this case have a partial electrically conductive coating 53, i.e. the main body 49 of the earthing element has uncoated regions and coated regions 53, the number, shape and arrangement of which can be suitably selected. Again, different types of coating are possible on both sides of the earthing element 16. It is also possible to have a full-surface electrically conductive coating on one side and a partial electrically conductive coating on the opposite side.

Figure 43:
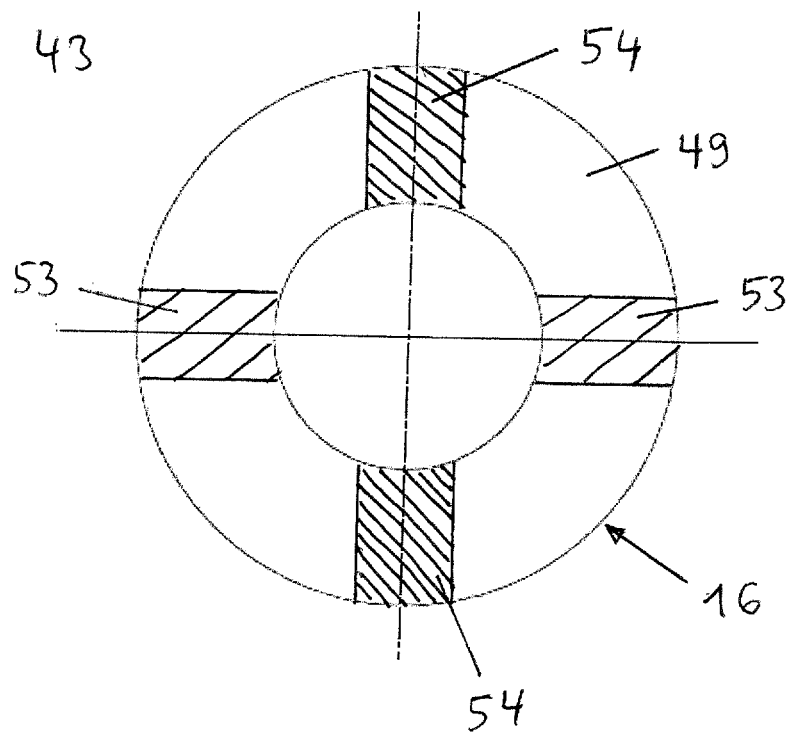

FIG. 43 shows a further embodiment in a view as in FIG. 42, with different partial electrically conductive coatings 53, 54 on the same side of the earthing element. Again, different types of coating are possible on both sides of the earthing element 16. It is also possible to have a full-surface electrically conductive coating on one side and partial electrically conductive coatings 53, 54 on the opposite side.

Figure 44:
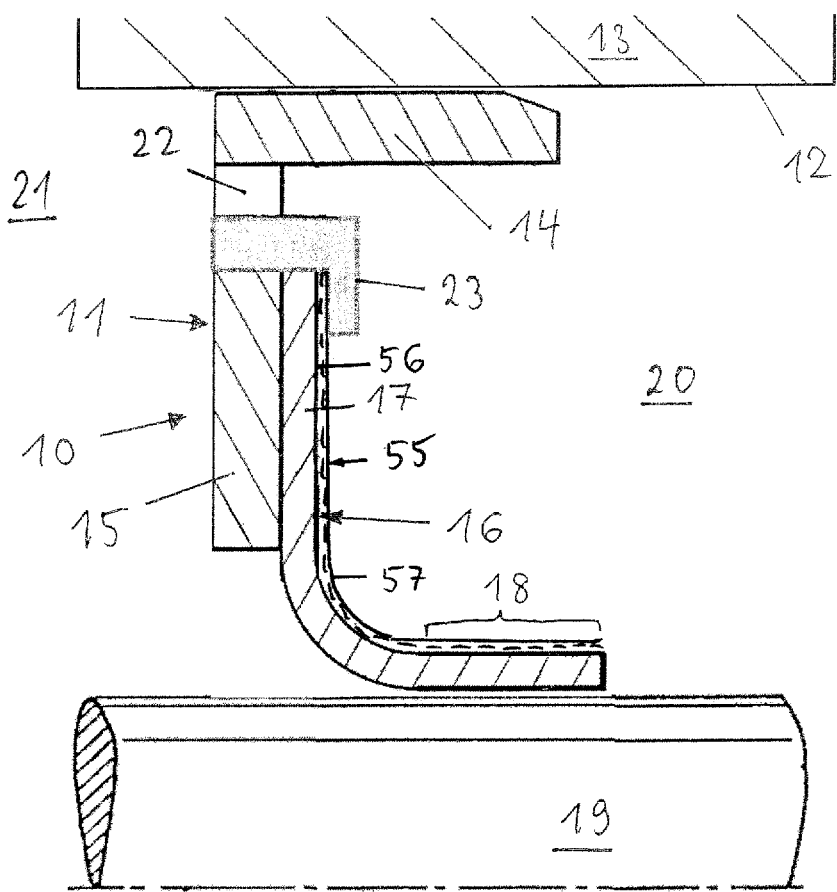

A further embodiment is shown in FIG. 44. In this case, the earthing element 16 has a multilayer electrically conductive coating 55 having a plurality of superimposed layers 56, 57, of which one, a plurality or all are electrically conductive.

EMBODIMENTS

Embodiment 1. Shaft earthing ring (10) for establishing an electrical potential connection between a rotating shaft (19) and a housing (13) of an electric motor, comprising an electrically conductive earthing element (16) which has a contact portion (18) that contacts the shaft, and a metal support body (11) fixed to the housing, characterised in that the metal support body (11) has at least one ventilation opening (22) which allows ventilation of a housing interior (20) while bypassing the earthing element (16).

Embodiment 2. Shaft earthing ring according to embodiment 1, characterised in that the earthing element (16) is an electrically conductive, elastically deformable annular disc.

Embodiment 3. Shaft earthing ring according to either embodiment 1 or embodiment 2, characterised in that the earthing element (16) is in one piece.

Embodiment 4. Shaft earthing ring according to any of the preceding embodiments, characterised in that the shaft earthing ring (10) has at least one holding and/or centring element (23, 25, 38) which is arranged and designed to hold the earthing element (16) in a desired position in the shaft earthing ring (10).

Embodiment 5. Shaft earthing ring according to embodiment 3, characterised in that the at least one holding and/or centring element (23, 25, 38) is formed in one piece with and/or from the support body (11).

Embodiment 6. Shaft earthing ring according to either embodiment 3 or embodiment 4, characterised in that the at least one holding and/or centring element (23, 25, 38) is arranged on the outer circumference of the earthing element (16).

Embodiment 7. Shaft earthing ring according to any of the preceding embodiments, characterised in that the earthing element (16) is connected to the support body (11) via an adhesive (24).

Embodiment 8. Shaft earthing ring according to any of the preceding embodiments, characterised in that the shaft earthing ring (10) comprises a clamping ring (26) for clamping the earthing element (16) to the support body (11).

Embodiment 9. Shaft earthing ring according to embodiment 7, characterised in that the clamping ring (26) has at least one electrically conductive penetration element (30, 41) which penetrates into the earthing ring (16) in the assembled state.

Embodiment 10. Shaft earthing ring according to either embodiment 7 or embodiment 8, characterised in that an electrically conductive contacting element (33) is provided for putting the clamping ring (11) into contact with the housing (13).

Embodiment 11. Shaft earthing ring according to any of the preceding embodiments, characterised in that the support body (11) has at least one electrically conductive, protruding penetration part (23, 42) which penetrates into the earthing ring (16) in the assembled state.

Embodiment 12. Shaft earthing ring according to any of the preceding embodiments, characterised in that the support body (11) has, on its inner circumference, at least one electrically conductive extension (43) which contacts the earthing element (16) in the assembled state, in particular in a transition portion (44) between an attachment portion (17) and a contact portion (18) of the earthing element (16).

Embodiment 13. Shaft earthing ring according to any of the preceding embodiments, characterised in that the earthing element (16) is fastened to the support body (11) by means of rivets (45).

Embodiment 14. Shaft earthing ring according to any of the preceding embodiments, characterised in that a base material of the earthing element (16) consists of a fluoropolymer such as PTFE, FKM, an elastomer or fluorinated thermoplastic.

Embodiment 15. Shaft earthing ring according to any of the preceding embodiments, characterised in that conductive fillers, such as metal, metallised or metal-coated particles, fibres and/or hollow spheres, conductive carbon black, nanotubes or conductive fibres, for example carbon fibres, are introduced into the earthing element (16).

Embodiment 16. Shaft earthing ring according to any of the preceding embodiments, characterised in that the shaft earthing ring (10) is designed to exert a spring preload on the earthing element (16).

Embodiment 17. Shaft earthing ring according to embodiment 15, characterised in that the shaft earthing ring (10) has at least one spring element (37) which is designed to exert the spring preload.

Embodiment 18. Shaft earthing ring according to embodiments 7 and 16, characterised in that the spring element (37) is formed by the clamping ring (26).

Embodiment 19. Shaft earthing ring according to any of the preceding embodiments, characterised in that the ventilation opening (22) is a through-hole through a radial portion (15) of the support body (11).

Embodiment 20. Shaft earthing ring according to any of the preceding embodiments, characterised in that the ventilation opening (22) is an axial groove on the outer circumference of the support body (11).

Embodiment 21. Shaft earthing ring according to any of the preceding embodiments, characterised in that the earthing element (16) has an electrically conductive surface coating (50-57).

The invention claimed is:

1. A shaft earthing ring for establishing an electrical potential connection between a rotating shaft and a housing of an electric motor, comprising:
   an electrically conductive earthing element which has a contact portion that is configured to contact a rotating shaft of an electric motor, and
   a metal support body configured to be fixed to a housing of the electric motor, wherein when the contact portion contacts the rotating shaft and the metal support body is fixed to the housing, an electrical potential connection is established between the rotating shaft and the housing,
   wherein the metal support body has at least one ventilation opening which allows ventilation of a housing interior of the electric motor while bypassing the electrically conductive earthing element.

2. The shaft earthing ring according to claim 1, wherein the electrically conductive earthing element is an electrically conductive, elastically deformable annular disc.

3. The shaft earthing ring according to claim 1, wherein the electrically conductive earthing element is in one piece.

4. The shaft earthing ring according to claim 1, further comprising: at least one holding and/or centring element chat is arranged and designed to hold the electrically conductive earthing element in a desired position in the shaft earthing ring.

5. The shaft earthing ring according to claim 4, wherein the at least one holding and/or centring element is formed in one piece with and/or from the support body.

6. The shaft earthing ring according to claim 4, wherein the at least one holding and/or centring element is arranged on an outer circumference of the electrically conductive earthing element.

7. The shaft earthing ring according to claim 1, wherein the electrically conductive earthing element is connected to the support body via an adhesive.

8. The shaft earthing ring according to claim 1, further comprising: a clamping ring that clamps the electrically conductive earthing element to the support body.

9. The shaft earthing ring according to claim 8, wherein the clamping ring has at least one electrically conductive penetration element that penetrates into the earthing ring in an assembled state.

10. The shaft earthing ring according to claim 8, wherein an electrically conductive contacting element is provided for putting the clamping ring into contact with the housing.

11. The shaft earthing ring according to claim 1, wherein the support body has at least one electrically conductive, protruding penetration part that penetrates into the earthing ring in an assembled state.

12. The shaft earthing ring according to claim 1, wherein the support body has, on an inner circumference of the support body, at least one electrically conductive extension that contacts the electrically conductive earthing element in an assembled state in a transition portion between an attachment portion and a contact portion of the electrically conductive earthing element.

13. The shaft earthing ring according to claim 1, wherein the electrically conductive earthing element is fastened to the support body via rivets.

14. The shaft earthing ring according to claim 1, wherein a base material of the electrically conductive earthing element consists of a fluoropolymer, PTFE, FKM, an elastomer, or fluorinated thermoplastic.

15. The shaft earthing ring according to claim 1, wherein conductive fillers; metal; metallised or metal-coated particles, fibres, and/or hollow spheres; conductive carbon black; nanotubes; conductive fibres; or carbon fibres, are introduced into the electrically conductive earthing element.

16. The shaft earthing ring according to claim 1, wherein the shaft earthing ring is designed to exert a spring preload on the electrically conductive earthing element.

17. The shaft earthing ring according to claim 16, wherein the shaft earthing ring has at least one spring element which is designed to exert the spring preload.

18. The shaft earthing ring according to claim 8, wherein the shaft earthing ring is designed to exert a spring preload on the electrically conductive earthing element, wherein the shaft earthing ring has at least one spring element that is designed to exert the spring preload, wherein the at least one spring element is formed by the clamping ring.

19. The shaft earthing ring according to claim 1, wherein the ventilation opening is a through-hole through a radial portion of the support body.

20. The shaft earthing ring according to claim 1, wherein the ventilation opening is an axial groove on an outer circumference of the support body.

21. The shaft earthing ring according to claim 1, wherein the electrically conductive earthing element has an electrically conductive surface coating.

22. An electric motor, comprising:
a housing;
a rotating shaft; and
the shaft earthing ring according to claim 1, wherein the shaft earthing ring establishes an electrical potential connection between the rotating shaft and the housing.

* * * * *